Nov. 14, 1967  W. N. CARSON, JR., ET AL  3,352,718
SEA WATER-ACTIVATED PRIMARY BATTERY
Filed July 23, 1963
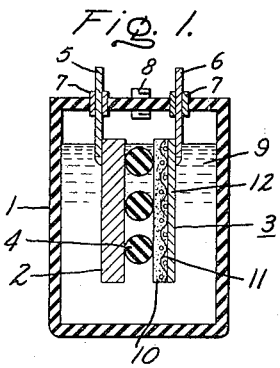
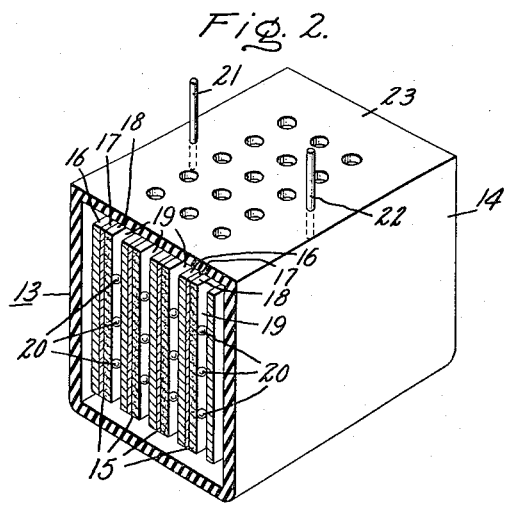
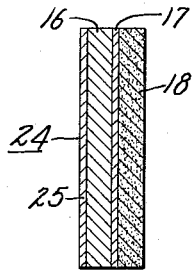
Inventors:
William H. Fischer,
William N. Carson, Jr.
by Paul A. Frank
Their Attorney.

United States Patent Office 3,352,718
Patented Nov. 14, 1967

3,352,718
SEA WATER-ACTIVATED PRIMARY BATTERY
William N. Carson, Jr., Schenectady, N.Y., and William H. Fischer, Boulder, Colo., assignors to General Electric Company, a corporation of New York
Filed July 23, 1963, Ser. No. 297,119
3 Claims. (Cl. 136—91)

This invention pertains generally to electrical batteries, and more particularly, to a battery employing a magnesium anode electrochemically associated with a cathode of silver chloride or cuprous chloride which is operated with aqueous electrolyte. Specifically, the present invention relates to improvement in a water-activated battery operation by reducing polarization of the magnesium anode especially at high rates of discharge.

Water-activated batteries employing a silver chloride or cuprous chloride cathode with an anode of elemental magnesium are commercially available. The cells may be stored dry and thereafter activated by immersion in the aqueous electrolyte or by means of passing electrolyte through a perforated cell housing. While the electrochemical action may be initiated with distilled or tap water, better performance is obtained with an ionic electrolyte. The battery is generally characterized as capable of delivering large amounts of electrical power over short periods of time after activation, a high energy-to-weight or size ratio in the inactive state, and a short life once activation has been initiated. A common application for the device is marine use to supply power for torpedo propulsion systems, electrical lamps, buoys, and the like. While a usable battery may be constructed with a single anode member spaced apart from a single cathode member by dielectric separator means, practical voltage and current requirements generally dictate a plurality of unit cells having the described construction. Various multi-cell arrangements having a stack of the individual cells with output terminals at the end cells to establish an electrical series connection across the entire assembly are known. A particularly compact and efficient multi-cell embodiment employs composite electrodes each having a layer of magnesium in association with a layer of the chloride compound through a common conducting support.

The principal technical problems in a water-activated battery are passivation and polarization of the magnesium anode. Pure magnesium and conventional magnesium alloys react readily with water vapor and oxygen at ordinary environments to form adherent oxide films rendering the anode passive to subsequent electrochemical reaction. Another serious problem is acute polarization of the anode at the high drain rates ordinarily encountered. Polarization is attributed to formation of porous oxide and/or hydroxide films on the anode causing even further undesirable results. More particularly, the permeable films produce localized self-discharge between adjacent anodic and cathodic areas on the same surface for substantial polarization even at open circuit. Localized discharge also generates excess hydrogen sporadically on the electrode surface during operation interfering with electrolyte passage in the relatively narrow free space separating adjacent electrodes in a multi-cell construction.

Protective fluoride films have been proposed for magnesium in various applications. In one method, a magnesium sheet is simply contacted with hydrofluoric acid to form an oxidation-resistant surface layer preventing corrosive attack of the substrate during subsequent mechanical processing. A second method forms the protective layer on a magnesium anode in a primary galvanic cell with an electrolyte comprising a 50 percent chromic acid solution containing minor concentrations of specific alkali metal fluorides. While the electrolyte provides desirable continuous formation of a protective film in a prior cell having a magnesium anode and a graphite cathode, such an electrolyte could not be used in a water-activated battery. Furthermore, the generally corrosive nature of this electrolyte would seriously hinder utilization even in the prescribed use.

It is one important object of the invention to provide means for reducing passivation and polarization of a magnesium anode in a water-activated battery without interfering with the general anode function.

It is still another object of the invention to provide chemical additives for the electrolyte in a sea water activated battery which also improve the electrochemical response of the magnesium anode.

A still further object of the invention is to provide surface coatings for the magnesium anode in a water-activated battery which is activated by sea water electrolyte.

These and other objects of the invention will be apparent in the following description taken in connection with the accompanying drawings in which:

FIGURE 1 is a schematic representation, partially in cross section, of a water-activated battery of the invention;

FIGURE 2 is a perspective view in partial cross section illustrating a preferred multi-cell water activated battery of the invention; and FIGURE 3 is a cross-sectional view representing one electrode construction of the invention.

Briefly, the improved water-activated battery of the invention comprises liquid container means housing at least one electrode arrangement consisting of a magnesium anode electrochemically associated with a cathode fabricated from a chloride compound selected from the class consisting of silver chloride and cuprous chloride, and a depolarizing agent selected from the class consisting of soluble fluoride salts, acids which do not oxidize magnesium, and mixtures thereof. A soluble fluoride salt in the aqueous electrolyte continuously produces an impermeable magnesium fluoride surface layer in lieu of the polarizing oxide or hydroxide film. Alternately, if the anode is coated with a soluble fluoride salt during construction of a reserve type cell, some measure of protection is afforded against oxide formation in storage. The class of acid additives useful in relatively small amounts to improve the electrochemical behavior of a magnesium anode in a water-activated battery are acids which dissolve magnesium oxide and magnesium hydroxide as distinct from oxidizing agents for magnesium.

Effective suppression of passivation and polarization in the anode can be obtained at additive concentrations as low as 0.1 molar solution of the aqueous electrolyte. At this concentration, the output voltage of a magnesium anode is increased from 0.1–0.2 of a volt at 2 amperes per square inch current density. On the other hand, maximum concentration of an additive is not critical for practice of the invention except for acid materials where it will be advisable to maintain the pH of the modified electrolyte above around 2.0 to prevent dissolution of active electrode materials by simple dissolving action rather than electrochemical response. Suitable fluoride additives for the electrolyte include the alkali metal fluorides of sodium fluoride, lithium fluoride, and potassium fluoride; heavy metal fluorides such as copper fluoride, zinc fluoride, iron fluoride, and cobalt fluoride; as well as ammonium compounds of ammonium fluoride and ammonium bifluoride. Representative acid additives include hydrochloric acid, sulfuric acid, and acetic acid, along with relatively weaker acids such as citric acid and oxalic acid.

FIGURE 1 shows in cross section the structure of a typical sea water battery employing a magnesium anode with a cuprous chloride cathode which contains dissolved additive in the seat water electrolyte. The battery comprises a case member 1 containing the electrolyte along with a magnesium anode 2, a cuprous chloride cathode 3, and insulating spacers 4 which separate the electrode elements. The anode and cathode may be fastened to the battery case by connecting leads 5 and 6, respectively, at battery terminals 7. A closure element 8 is provided in the battery case for admission of the sea water electrolyte 9 already containing the additive. Alternately, a reserve type cell may be constructed wherein only the additive occupies the electrolyte cavity until activation of the cell by admission of water. Magnesium anode 2 may comprise a rectangular flat sheet of approximately 0.030 inch thickness with a copper connecting lead soldered directly thereto in conventional fashion. Cuprous chloride cathode 3 may comprise a three-member assembly having a compacted cuprous chloride layer 10 embedded in a flat copper screen 11 which may be soldered directly to an approximately 0.002 inch thick rectangular flat copper current collector plate 12. It is preferable to insulate the connecting leads of the electrode to reduce corrosion in the electrolyte and internal current leakage. Assembly of the electrode elements in the battery may be accomplished simply by attaching the connecting leads at the battery terminals and inserting insulated spacers between the members. For simplicity of illustration, insulated spacers 4 are shown as being unsupported. The spacers may be attached to either electrode element or the battery case by known means. For ease of construction, the battery case may be fabricated from a nonconducting deformable solid such as rubber, glass, synthetic organic polymers, and the like. Likewise, it is preferred to provide portions of the electrode elements with a surface covering of a nonreactive soluble organic polymer thereby limiting electrochemical action to facing sides of the elements.

In FIGURE 2 there is depicted a perspective view, partially in cross section, of a multi-cell sea water activated battery of the invention. The present battery also differs from the preceding embodiment by employing a galvanic couple between magnesium and silver chloride in a perforated container. Battery 13 comprises an assembly of perforated case 14 and a plurality of the composite electrodes 15 defining individual cells in the battery. Each composite electrode comprises a first outer layer of magnesium 16 in contact with one major surface of an electrically conducting barrier layer 17, and a second outer layer of silver chloride 18 in contact with the opposing major surface of the barrier layer. Individual cells in the battery are defined by a magnesium layer of one composite electrode, a silver chloride layer from the next adjoining composite electrode which faces the magnesium layer and the intervening free space defined by the spacers. Each composite electrode thereby furnishes the cathode element for one unit cell along with the anode element for the next adjoining unit cell. As can be seen from the drawing, the battery assembly may consist simply of stacking the individual electrodes in the case so that free spaces 19 are defined therebetween by separator elements 20. Internal electrical connection between individual cells is made solely through the foil barrier layers 17 producing a series circuit whereby the output voltage at the battery terminals is an aggregate of component cell voltages. External connection of the cell series is made with leads 21 and 22 which project through perforated cover portion 23 in the battery case. Each lead may comprise 0.020 inch diameter copper wire fastened by means insuring good electrical contact to magnesium sheets at the end cells. The electrolyte additive of the battery may be stored in the battery case or mixed with sea water before admission.

In FIGURE 3 there is shown in cross section a preferred composite electrode of the invention which includes a surface coating of electrolyte additive on the magnesium layer. The same numbers used in the preceding figure identify common elements of the present electrode for uniformity of illustration. Composite electrode 24 comprises coated magnesium layer 16 bonded for good electrical connection to inner layer conducting foil 17 with outer layer 18 of the chloride compound being adhered to the opposite major surface of the foil. The second outer layer of the electrode is now a coating 25 of soluble fluoride compound which covers the exposed major surface of the magnesium layer. Such coatings provide some protection from oxidation of the magnesium during exposure to ordinary environments which results in less passivation of the electrode.

From the foregoing description, it will be apparent that an improved sea water activated battery has been provided which exhibits less electrode passivation polarization than before achieved. In addition, novel composite electrode structures, suitable for practice of the invention, have also been shown. It is not desired to limit the invention to the preferred embodiments above shown, however, since it will be obvious to those skilled in the art that certain modifications of the present teachings can be made without departing from the true spirit and scope of the invention. It is intended to limit the present invention, therefore, only to the scope of the following claims.

What we claim as new and desire to secure by Letters Patent of the United States is:

1. A sea water-activated primary battery which comprises liquid container means having at least one electrode arrangement consisting of a magnesium anode electrochemically associated with a cathode fabricated from a chloride compound selected from the class consisting of silver chloride and cuprous chloride, and a depolarizing agent for the magnesium anode selected from the class consisting of water-soluble fluoride salts, acids which do not oxidize magnesium, and mixtures thereof, said depolarizing agent having a concentration in sea water electrolyte employed to activate said battery of at least from 0.1 molar solution of said electrolyte up to a maximum concentration therein of pH2 for said acid depolarizing agent, in order to resist passivation and polarization in the battery by continuously producing a protective film on said magnesium anode during battery operation.

2. A sea water-activated battery which comprises liquid container means housing a plurality of serially connected unit cells, each cell consisting of a magnesium anode electrochemically associated with a cathode fabricated from a chloride compound selected from the class consisting of silver chloride and cuprous chloride, the individual anodes and cathodes being spaced apart with dielectric spacer means, and a depolarizing agent for the magnesium anodes selected from the class consisting of water-soluble fluoride salts, acids which do not oxidize magnesium, and mixtures thereof, said depolarizing agent having a concentration in sea water electrolyte employed to activate said battery of at least 0.1 molar solution of said electrolyte up to a maximum concentration therein of pH2 for said acid depolarizing agent, in order to resist passivation and polarization in the battery by continuously producing a protective film on said magnesium anodes during battery operation.

3. A sea water-activated primary battery which comprises liquid container means housing at least one electrode arrangement consisting of a magnesium anode electrochemically associated with a cathode fabricated from a chloride compound selected from the class consisting of silver chloride and cuprous chloride, and a depolarizing agent for the magnesium anode consisting of a water-soluble fluoride salt additive to the sea water electrolyte employed to activate said battery, said depolarizing agent being present in a concentration of at least from 0.1 molar solution of said electrolyte, in order to resist passivation and polarization in the battery by continuously producing a protective film on said magnesium anode during battery operation.

References Cited

UNITED STATES PATENTS

| | | | |
|---|---|---|---|
| Re. 22,053 | 3/1942 | Ruben. | |
| 2,428,850 | 10/1947 | Lawson | 136—137 X |
| 2,655,551 | 10/1953 | Ellis. | |
| 3,129,118 | 4/1964 | Wilke et al. | 136—100 |

OTHER REFERENCES

Armstrong et al., "Raw Materials From the Sea," 1946, pages 20 and 38.

Vinal, "Primary Batteries," 1950, pages 274–279.

Sears, "Oceanography, American Association for the Advancement of Sciene," publication No. 67, 1961, pages 565 and 552.

Mero, "The Mineral Resources of the Sea," 1965, pages 46 and 47, Table IV (1963 data).

WINSTON A. DOUGLAS, *Primary Examiner.*

B. J. OHLENDORF, A. SKAPARS, *Assistant Examiners.*